US007233227B2

(12) United States Patent
Lemoult

(10) Patent No.: US 7,233,227 B2
(45) Date of Patent: Jun. 19, 2007

(54) VEHICLE ANTI-THEFT SYSTEM AND METHOD, AND APPLICATION OF THIS SYSTEM FOR MANAGING A FLEET OF VEHICLES

(75) Inventor: Thierry Lemoult, Dugny (FR)

(73) Assignee: Eileo, Paris (FR)

( * ) Notice: Subject to any disclaimer, the term of this patent is extended or adjusted under 35 U.S.C. 154(b) by 173 days.

(21) Appl. No.: 10/540,125

(22) PCT Filed: Dec. 17, 2003

(86) PCT No.: PCT/FR03/03757

§ 371 (c)(1),
(2), (4) Date: Jun. 20, 2005

(87) PCT Pub. No.: WO2004/056621

PCT Pub. Date: Jul. 8, 2004

(65) Prior Publication Data

US 2006/0125610 A1    Jun. 15, 2006

(30) Foreign Application Priority Data

Dec. 18, 2002    (FR)    ................... 02 16053

(51) Int. Cl.
*G05B 19/00*    (2006.01)
(52) U.S. Cl. ................. 340/5.62; 340/5.61; 340/426.1; 340/10.3; 340/825.69; 341/42
(58) Field of Classification Search ...... 340/5.61–5.64, 340/10.1, 426.1, 425.5; 341/176; 342/42
See application file for complete search history.

(56) References Cited

U.S. PATENT DOCUMENTS 5,583,486 A * 12/1996 Kersten ................... 340/572.1
5,734,330 A * 3/1998 Nakamura ................ 340/5.22
5,939,975 A    8/1999 Tsuria et al.
6,144,293 A * 11/2000 Plaschko et al. ....... 340/426.14
6,172,608 B1 * 1/2001 Cole ........................ 340/572.1
6,376,930 B1 * 4/2002 Nagao et al. ............... 307/10.2
6,781,507 B1 * 8/2004 Birchfield et al. ......... 340/5.61
6,828,902 B2 * 12/2004 Casden ...................... 340/10.3
6,924,729 B1 * 8/2005 Aschauer et al. .......... 340/5.53
2001/0000957 A1    5/2001 Birchfield et al.
2001/0028295 A1    10/2001 Brinkmeyer et al.
2002/0008645 A1    1/2002 Flick et al.

FOREIGN PATENT DOCUMENTS

| EP | 1 128 335 | 8/2001 |
| WO | WO 93/05987 | 4/1993 |
| WO | WO 98/51548 | 11/1998 |

* cited by examiner

*Primary Examiner*—Jeffery Hofsass
*Assistant Examiner*—Hoi C. Lau
(74) *Attorney, Agent, or Firm*—Young & Thompson

(57) ABSTRACT

A vehicle anti-theft system, includes in a passive relay enabling an electronic label (2) usually identified when proximate to a transponder (1) to be offset. The electronic label (2) is integrated in a reinforced casing. Communication between the label and the transponder (1) is set up via an antenna (4) proximate the transponder (1), an electric cable and a second antenna (5) proximate the label. The cable includes an electromechanical switch enabling a control switch (8) to interrupt or set up the radio link. The invention therefore provides a novel anti-theft system for which the installation is entirely reversible and having no damaging effect on the vehicle since it does not require disconnecting a vehicle cable and entails no splicing.

17 Claims, 3 Drawing Sheets

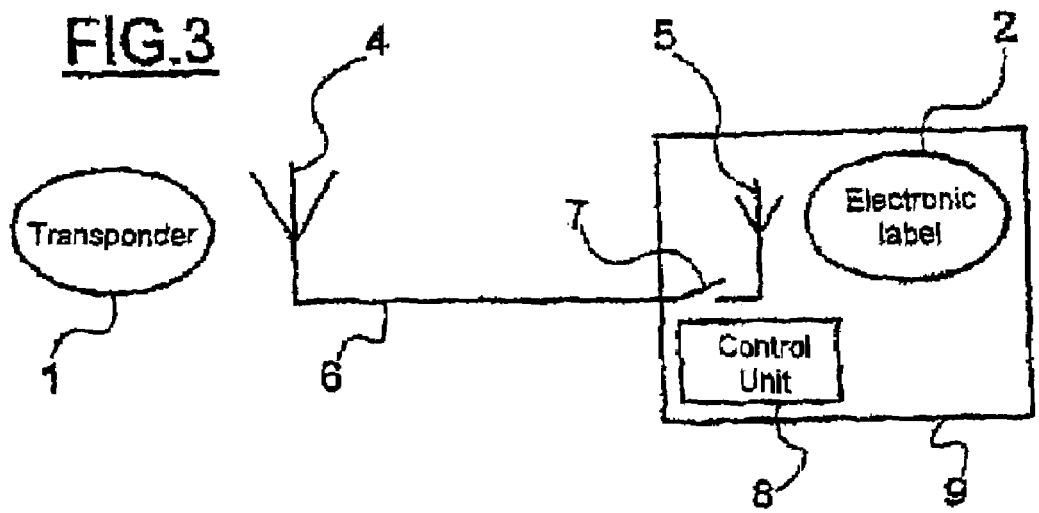
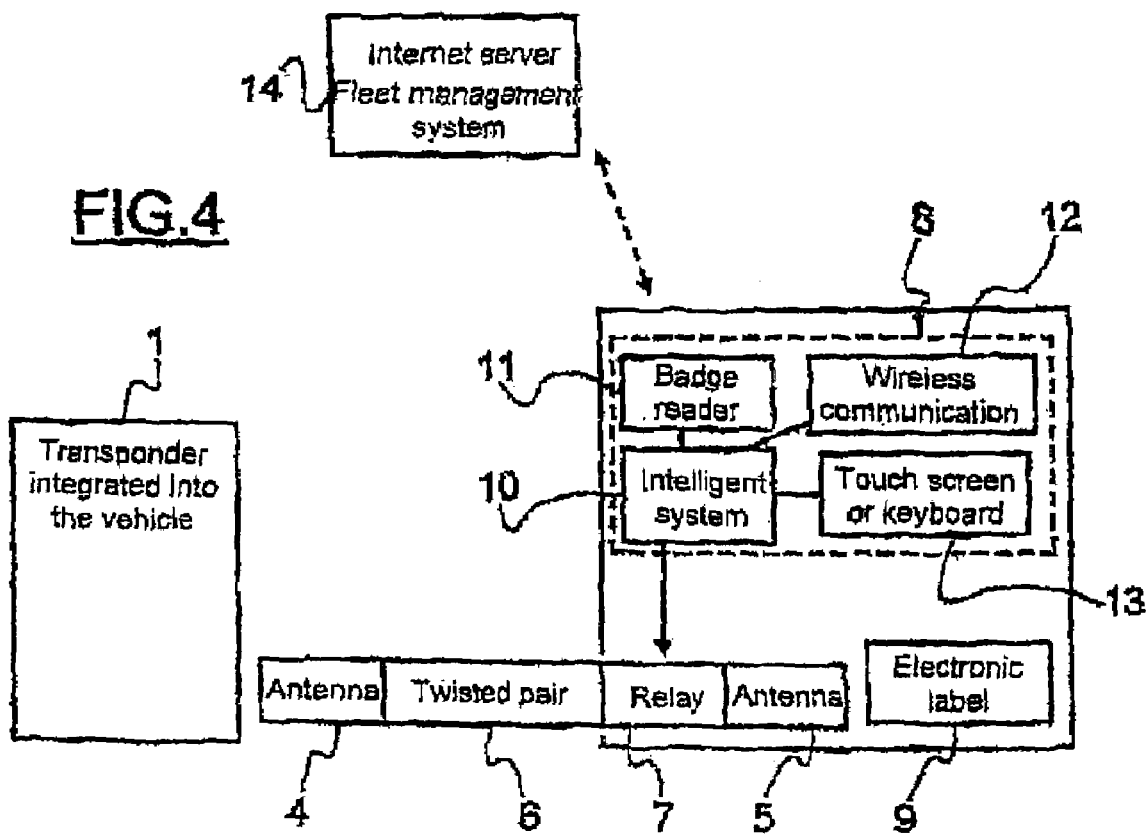

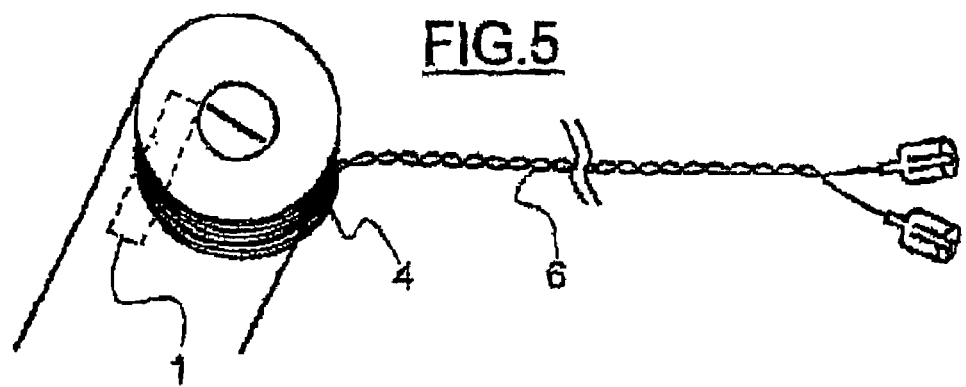
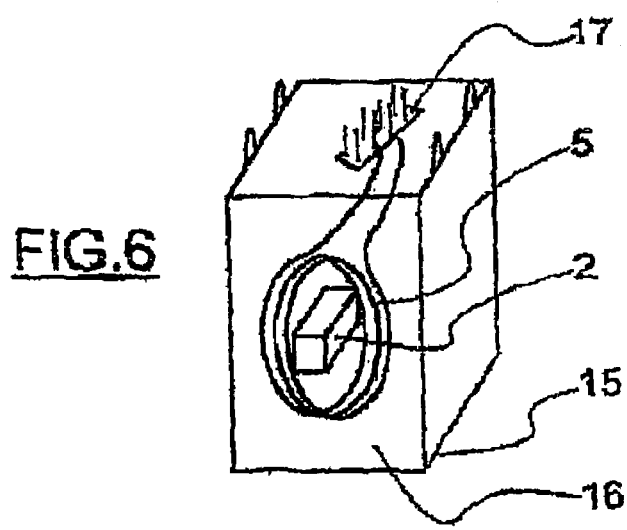
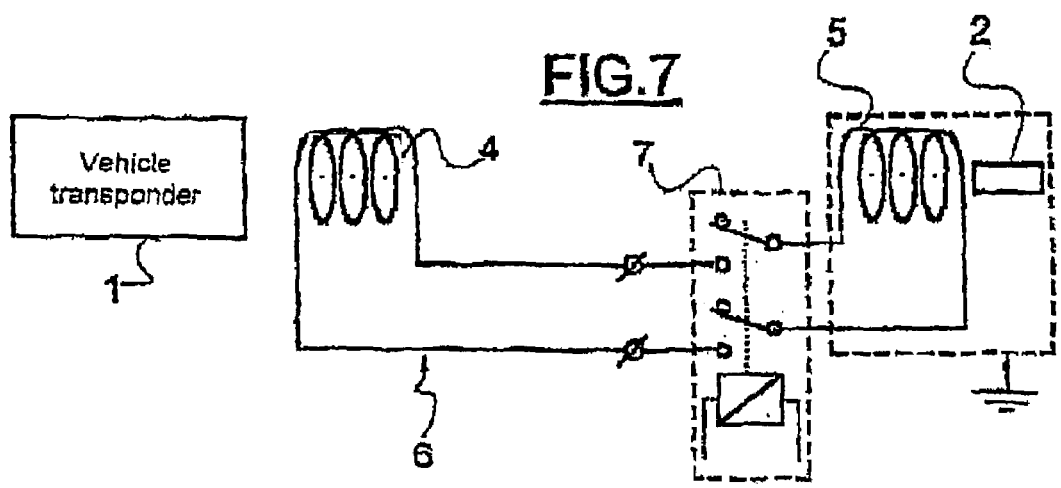

VEHICLE ANTI-THEFT SYSTEM AND METHOD, AND APPLICATION OF THIS SYSTEM FOR MANAGING A FLEET OF VEHICLES

The present invention relates to a vehicle anti theft system and method. It has one particularly advantageous, but not exclusive, application in the management of a fleet of vehicles.

Most present-day vehicles currently include an immobilizing system. This immobilization is generally constituted by an electronic label integrated in the ignition key and intended to communicate with a transponder integrated in the ignition lock of the vehicle, this transponder being connected to immobilisation means.

The document US20010028295 is known, which describes an electronic key equipped with an intelligent system for receiving user "credits" from a control centre. The electronic key communicates bi-directionally with the vehicle. The latter has an electronic system in order to verify, from data contained in the electronic key, whether the user and his user "credits" are valid, and if appropriate to authorize the starting of the vehicle.

However, such a system involves an electronic key containing most of the intelligence of the system, which is problematic because, generally, keys are subjected to many shocks, and can therefore be damaged easily. Moreover, the price of an electronic key is much greater compared to the conventional systems.

The document US20010000957 (WO9851548) is also known, which describes a remote start system connected to an anti-theft security system. This document in particular discloses a first transponder arranged close to the ignition lock, a second transponder arranged in the ignition key, a third transponder, similar to the second transponder, arranged in the vehicle close to the first transponder. The first and third transponders only communicate when a remote starting controller authorizes this communication, In normal operation therefore, the first and third transponders do not communicate. In order to inhibit this communication, i.e. the electromagnetic coupling, a fourth transponder, in the form of an antenna, is arranged around the third transponder. This antenna (fourth transponder) is activated or deactivated by a closing or opening control or a switch arranged in the circuit of the antenna, the control coming from the remote starting controller.

The purpose of the present invention is to propose a novel anti-theft system whose installation is entirely reversible and will not damage the vehicle.

The purpose of the present invention is also to propose a novel anti-theft system with improved security.

Another purpose of the invention is to propose an anti-theft system which can be set up according to the user.

A subject of the invention is also an anti-theft system allowing automatic management of a fleet.

At least one of the afore-mentioned objectives is attained with a vehicle anti-theft system, comprising:
an immobilizing transponder integrated in the vehicle,
an electronic label intended to communicate with the transponder, and
connection means which are able to establish or interrupt the communication between the transponder and the electronic label in response to orders coming from a control unit.

By immobilizing transponder, is understood a transponder connected to means for immobilizing or blocking the starting of the vehicle.

With the system according to the invention, it is possible to remove the electronic label from the key in order to integrate it in the vehicle, Moreover, in wireless mode, the communication is rendered inactive by surrounding the electronic label with a radio-shielding and/or by the electronic label being integrated in the vehicle far enough away from the transponder to prevent any electromagnetic coupling.

This radio-shielding is in the form of a cover or metallic case containing the electronic label, connected to earth and provided with a suitable connector.

With these precautions, the electronic label and the transponder cannot communicate, which prevents the starting of the vehicle. In order to authorize the starting, the radiocomunication must be re-established. In order to do this, the connection means can comprise:
a first antenna close to the transponder,
a second antenna close to the electronic label, and
an electrical connection equipped with a switch and connecting the two antennae, the switch being controlled by the control unit.

A person skilled in the art will easily understand that the term "close" implies a sufficient distance to produce an electromagnetic coupling. Preferably, the shielded case is large enough that the field lines of the second antenna can be closed.

With the system according to the invention, the vehicle is not damaged. The system does not require direct wiring with components which are integral parts of vehicles. In fact, a connection with these components could render the vehicle manufacturer's guarantee null and void. The invention therefore proposes a novel immobilizing system whose installation is entirely reversible and will not damage the vehicle. In fact, it does not require cutting of a cable of the vehicle. It does not entail splicing.

Effectively a passive relay has been created. By passive relay is understood a device for offsetting an antenna which does not comprise an active component such as an amplifier. The use of a passive relay, instead of an active relay, allows great independence of the system compared to the protocols and communication mode used by the vehicle's immobilizer.

When the two antennae are connected via the switch, which can be of the electromechanical type, an electromagnetic bridge forms thus coupling the electronic label to the transponder. The switch can be of any other type, such as for example a transistor-based device.

The passive relay is activated or deactivated by a control unit which can comprise:
a microcontroller for controlling the connection means as a function of data entered by a user,
a contact interface allowing the user to enter a code, and
an interface without contact for reading a user's badge.

According to an advantageous characteristic of the invention, the control unit also comprises means for wireless communication which are able to receive access authorization parameters which the microcontroller uses as a basis to compare the data entered by the user.

Preferably, the access authorization parameters come from a remote Internet server communicating with the wireless communication means by means of a communications protocol of the wireless Internet type. The user can therefore book a given vehicle via this Internet server by giving in particular a personal identification number as well as other parameters. The server will thus then send all of the access authorization parameters such as for example the time of use of the vehicle, the identity of a user's badge and a personal identification number, to the control unit inside the given vehicle. The present invention can therefore be applied perfectly to the management of a fleet of vehicles, in which the starting of a vehicle is authorized when, for a user,:

a valid reservation has been sent to the control unit previously from the remote server via the wireless communication means, and a valid badge is read by the interface without contact, and the user enters a personal identification number identical to a code previously sent to the control unit from the remote server.

The mode for transmission of the parameters can be via the mobile telephone network, via a satellite network, or via any other compatible type of wireless technology. In particular, the parameters can be entered by an operator (or user) in a dedicated portable or fixed device, then sent to the vehicles in a wireless manner.

According to the invention, each antenna can be constituted by a coil of turns with substantially identical diameter between the two antennae. The electrical connection can comprise a twisted pair.

According to a preferred embodiment of the invention, the second antenna and the electronic label are held in the radio-shielding by means of a cast resin. The invention is in particular characterized in that even if an unauthorized person removes the radio-shielding in order to place it close to the transponder, the electromagnetic coupling is not realized. The anti-theft security device is thus optimized.

Moreover, the control unit and the electronic label can advantageously be arranged on an electronic card installed in the housing of the car radio. The electronic card can be an intelligent platform identical to that used in electronic organisers capable of connecting to the Internet.

According to another aspect of the invention, a vehicle anti theft method is foreseen which has an immobilizing transponder, this transponder being intended to communicate with an electronic label integrated in the vehicle; in which communication between the transponder and the electronic label is established or interrupted in response to orders coming from a control unit. According to the invention, the communication is established or interrupted by controlling a switch which electrically connects a first antenna close to the transponder to a second antenna close to the electronic label.

Preferably, the electronic label comes from the vehicle's ignition key.

Other advantages and characteristics of the invention will become apparent on examination of the detailed description of an embodiment which is in no way limitative, and the attached drawings, in which:

FIG. 3 is a simplified block diagram representing the principle elements of the system according to the invention;

FIG. 4 is a detailed block diagram of the principle elements according to the invention;

FIG. 5 is a simplified view of a first antenna created close to the transponder;

FIG. 6 is a simplified view of a radio-shielding containing the electronic label and a second antenna; and FIG. 7 is a skeleton diagram showing the connection means between the transponder and the electronic label.

Figure 1:
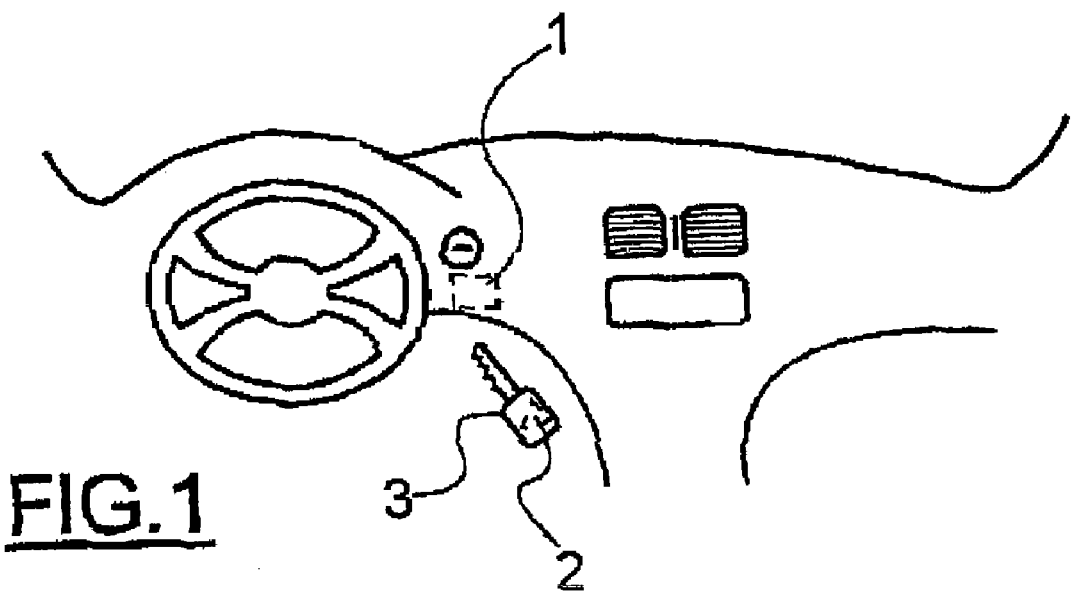
FIG. 1 is a skeleton diagram illustrating the arrangement of an electronic label and a transponder according to the prior art.

FIG. 1 according to the prior art represents a view of the interior of a vehicle equipped with a transponder 1 arranged in the ignition lock. The transponder 1 communicates with an electronic label 2 arranged in an ignition key when this electronic label is sufficiently close to the transponder. This occurs in particular when the key is inserted in the lock. When the transponder 1 and the electronic label 2 communicate and the information contained in the electronic label is valid, the transponder controls immobilization means (not represented) so as to allow the starting of the vehicle.

Figure 2:
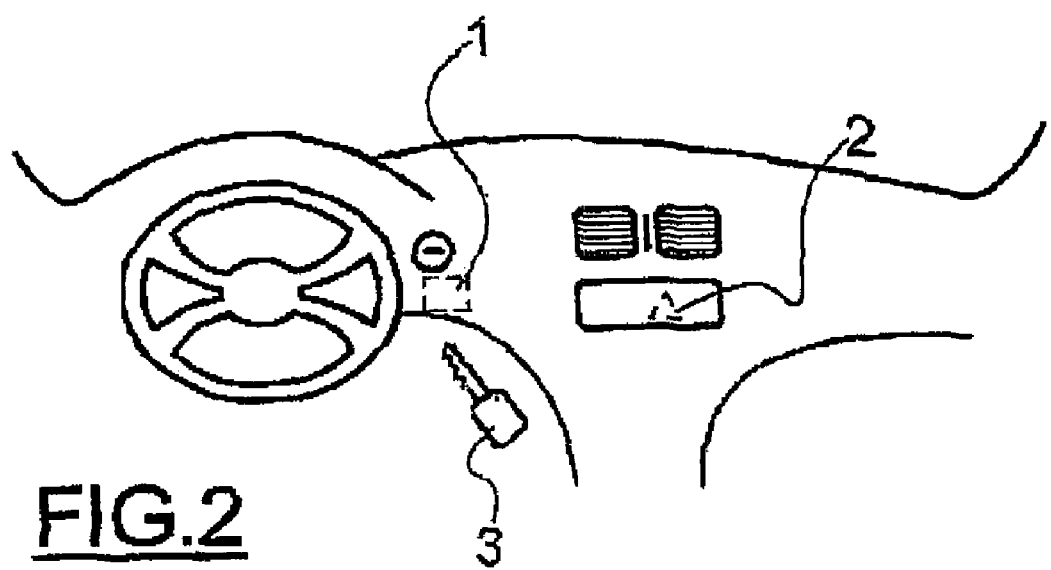
FIG. 2 is a skeleton diagram illustrating the arrangement of an electronic label and of a transponder according to the invention.

In FIG. 2 according to the invention, the interior of a vehicle integrating the system according to the invention is seen. The transponder 1 is still arranged in the lock of the vehicle. However, the electronic key 2 is no longer integrated in the ignition key 3 but in a case arranged in the location of the car radio.

The distance between the transponder 1 and the electronic label 2 according to the invention must be such that radiocommunication is rendered impossible. This radiocommunication at frequencies of the order of 150 kHz can be re-established by means of two antennae which can be connected according to the diagram of FIG. 3. In FIG. 3 there is seen a first antenna 4 arranged close to the transponder 1, a second antenna 5 arranged close to the electronic label 2, and an electric line 6 connecting the two antennae 4 and 5. This electric line 6 comprises a switch 7 which is able to interrupt or establish the connection between the two antennae 4 and 5. When the switch 7 is open, the two antennae are far enough apart so that the signals picked up by one of the two antennae are not passed over to the other antenna. When the switch 7 is closed, the two antennae 4 and 5 communicate.

The electronic label 2 is sufficiently close to the antenna 5, and the transponder 1 is sufficiently close to the antenna 4 so that a connection between the antennae 4 and 5 produces a radiocommunication between the transponder 1 and the electronic label 2.

The switch 2 is controlled by a control unit 8. The assembly switch 7, antenna 5, electronic label 2 and control unit 8, is arranged on an electronic card 9 integrated in the housing of the car radio.

In FIG. 4, the constituent elements of the invention are seen in more detail. The transponder 1 which is integrated into the vehicle and ensures the immobilizing function is seen. The electric line 6 is a twisted pair with a length of between 10 cm and 1 meter between the two antennae. There are approximately 3 twists per cm. The twisted pair ends in two FASTON® motor vehicle type terminals which are connected on the electronic card 9.

The switch 7 is controlled by an intelligent system such as a microcontroller 10 arranged in the control unit 8. This microcontroller 10 is connected inside the control unit 8 to a badge reader 11, a touch screen or a keyboard 13 and a wireless communications interface 12 capable of communicating with a remote server 14.

In one application of management of a fleet of vehicles, the remote server 14 can be an Internet server integrating a fleet management system and capable of wireless communication with the interface 12. The operation of this server can be as follows: a user books a vehicle via the Internet server by giving in particular a personal identification number. This personal identification number as well as other access authorization parameters such as the time and the identification of a user's badge are transmitted by means of a wireless Internet technology such as for example GPRS, 802.11, UMTS, Bluetooth, to the wireless communications interface 12 arranged under the electronic card 9. The transmission is encrypted at the application layer (SSL, SSH, MD5). When the user inserts his badge into the badge reader 11 and enters a personal identification number by means of the interface 13, the microcontroller 10 is able to compare the data entered with the access authorization parameters so as to allow or not allow contact of the switch 7, which remains open in its position of rest. The closure of the switch 7 signifies authorization for starting. The starting is authorized if and only if:

a valid booking has been sent by the server 14 to the control unit, a valid badge has been read by the badge reader 11, and the user enters a personal identification number identical to that sent by the server.

The electronic card 9 can be an electronic platform such as that used in electronic organisers such as for example POCKETPC® (IPAQ COMPAQ®, TOSHIBA®;).

In FIG. 5, the antenna 4 produced in the form of ten turns of rigid single-strand cable whose tinned core has a diameter of thirty hundredths of a millimeter. This antenna is arranged around the ignition lock of the vehicle as close as possible to the antenna of the transponder 1.

The turns of the antenna 4 are hidden by the interior coverings of the vehicle and are directly connected to the twisted pair 6.

According to the invention, the electronic label 2 is removed from the ignition key of the vehicle, and placed in a shielded cover 15 such as represented in FIG. 6. This shielded cover is to be attached to the electronic card 9 installed in the housing of the car radio.

Connectors which are to be soldered 17 allow the connection between the antenna 5 arranged in the shielded cover 15 and the controlled switch 7. The fact that the label is at a distance from the transponder and is surrounded by a radio-shielding, prevents communication and prohibits starting.

The antenna 5 is produced in the form of a coil of ten turns for example, with a diameter which is more or less equal to that of the coil 4 arranged around the ignition lock. The electronic label 2, originally contained in the ignition key of the vehicle, is placed in the centre of the coil 5 and is orientated so as to maximize the electromagnetic coupling with an internal antenna (not represented) of the electronic label 2. This orientation can be deduced from the usual orientation of the electronic label in the ignition key in relation to the antenna of the transponder integrated in the ignition lock. In order to hold the coil 5 and the electronic label 2, cast resin is arranged in the shielded cover 15. The two wires of the coil 5 end in the connector 17.

In order to authorize the starting, i.e. to establish the radiocommunication between the electronic label and the transponder 1, an electrical contact must be realized between the two antennae 4 and 5 via the twisted pair 6 and the controlled switch 7. This electrical contact allows the formation of an electromagnetic bridge coupling the electronic label 2 and the transponder 1. The switch 7 is of the electromechanical type comprising two contacts, one contact per electrical conductor of the twisted pair, according to FIG. 7. The usual precautions known to a person skilled in the art should be applied in this embodiment in order to prevent cross coupling occurring which would bypass the switch and would make the cut-off inoperative.

When the switch is closed, starting is possible. When the switch is open starting is prevented (position of rest).

The present invention therefore consists of a passive repeater allowing the offsetting of an electronic label usually recognized when it is close to a transponder. The electronic label is integrated in a shielded cover. It is placed in communication with the transponder via an antenna close to the transponder, an electric cable and a second antenna close to the label. The cable comprises an electromechanical switch allowing a control unit to interrupt or to establish the radio link.

Of course, the invention is not limited to the examples which have just been described and many variations can be made to these examples without going beyond the scope of the invention. The system can in particular be reversible, in the sense that the radio-shielding and the cast resin can be arranged around the first antenna 4 and the electronic card supporting the control unit and the switch, also holds the radio-shielding.

The invention claimed is:

1. Vehicle anti theft system, comprising:
   an immobilizing transponder integrated in the vehicle,
   an electronic label intended to communicate with the transponder, and
   connection means which are able to establish or interrupt the communication between the transponder and the electronic label in response to orders coming from a control unit, characterized in that the connection means include:
   a first antenna close to the transponder,
      a second antenna close to the electronic label, and
      an electrical connection equipped with a switch and connecting the two antennae, the switch being controlled by the control unit.

2. System according to claim 1, characterized in that in wireless mode, the communication is rendered inactive by the electronic label being integrated in the vehicle far enough away from the transponder to prevent any electromagnetic coupling.

3. System according to claim 1, characterized in that in wireless mode, the communication is rendered inactive by surrounding the electronic label with a radio-shielding.

4. System according to claim 1, characterized in that the switch is of the electromechanical type.

5. System according to claim 1, characterized in that the electrical connection comprises a twisted pair.

6. System according to claim 1, characterized in that each antenna is constituted by a coil of turns with a diameter which is substantially identical between the two antennae.

7. System according to claim 1, characterized in that the second antenna and the electronic label are held in the radio-shielding by means of a cast resin.

8. System according to claim 1, characterized in that the control unit comprises:
   a microcontroller for controlling the connection means as a function of data entered by a user,
   a contact interface allowing the user to enter a code, and
   an interface without contact for reading a user's badge.

9. System according to claim 8, characterized in that the control unit also comprises wireless communication means which are able to receive access authorization parameters which the microcontroller uses as a basis to compare the data entered by the user.

10. System according to claim 9, characterized in that the access authorization parameters come from a remote Internet server communicating with the wireless communication means by means of a communications protocol of the wireless Internet type.

11. System according to claim 1, characterized in that the control unit and the electronic label are arranged on an electronic card installed in the housing of the car radio.

12. Application of the system according to claim 9 for the management of a fleet of vehicles, in which the starting of a vehicle is authorized when, for a user,:

a valid reservation has been sent to the control unit preciously from a remote server via the wireless communication means, and a valid badge is read by the interface without contact, and the user enters a personal identification number identical to a number previously sent to the control unit from the remote server.

13. Method for immobilizing a vehicle having an immobilizing transponder, this transponder being intended to communicate with an electronic label integrated in the vehicle; in which the communication between the transponder and the electronic label is established or interrupted in response to orders coming from a control unit, characterized in that the communication is established or interrupted by controlling a switch which electrically connects a first antenna close to the transponder to a second antenna close to the electronic label.

14. Method according to claim 13, characterized in that the electronic label comes from the ignition key of the vehicle.

15. Method according to claim 13, for the management of a fleet of vehicles, in which the starting of a vehicle is authorized when, for a user,:

a valid reservation has been sent to the control unit previously from a remote server via the wireless communication means, and a valid badge is read by the interface without contact, and the user enters a personal identification number identical to a number previously sent to the control unit from the remote server.

16. Method according to claim 14, for the management of a fleet of vehicles, in which the starting of a vehicle is authorized when, for a user,:

a valid reservation has been sent to the control unit previously from a remote server via the wireless communication means, and a valid badge is read by the interface without contact, and the user enters a personal identification number identical to a number previously sent to the control unit from the remote server.

17. System according to claim 2, characterized in that in wireless mode, the communication is rendered inactive by surrounding the electronic label with a radio-shielding.

* * * * *